United States Patent
Bierman et al.

(10) Patent No.: US 10,310,827 B2
(45) Date of Patent: Jun. 4, 2019

(54) FLOW-BASED SCOPING

(71) Applicant: Oracle International Corporation, Redwood Shores, CA (US)

(72) Inventors: Gavin Mark Bierman, Cambridge (GB); Brian Goetz, Williston, VT (US); Guy Steele, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/947,432

(22) Filed: Apr. 6, 2018

(65) Prior Publication Data

US 2018/0293058 A1    Oct. 11, 2018

Related U.S. Application Data

(60) Provisional application No. 62/483,342, filed on Apr. 8, 2017.

(51) Int. Cl.
| | | |
|---|---|---|
| *G06F 9/44* | (2018.01) |
| *G06F 8/41* | (2018.01) |
| *G06F 8/33* | (2018.01) |
| *G06F 8/20* | (2018.01) |
| *G06F 11/36* | (2006.01) |

(52) U.S. Cl.
CPC .............. *G06F 8/433* (2013.01); *G06F 8/24* (2013.01); *G06F 8/33* (2013.01); *G06F 8/425* (2013.01); *G06F 8/436* (2013.01); *G06F 11/3624* (2013.01)

(58) Field of Classification Search
CPC ............................................... G06F 8/00–8/54
USPC .................................................. 717/100–167
See application file for complete search history.

(56) References Cited

U.S. PATENT DOCUMENTS

| | | | |
|---|---|---|---|
| 7,827,127 B2 | 11/2010 | Wolf et al. | |
| 2008/0052695 A1 | 2/2008 | Dickenson | |
| 2009/0112779 A1* | 4/2009 | Wolf | G06F 9/5038 706/14 |
| 2015/0309913 A1* | 10/2015 | Bates | G06F 8/436 717/132 |
| 2017/0147475 A1* | 5/2017 | Abadi | G06F 8/433 |

OTHER PUBLICATIONS

"Chapter 9—Structuring algorithms" In: Laszlo Boeszoermenyi and Carsten Welch: "Programming in Modula-3", 1996, Springer-Verlag, XP009506674, pp. 173-199.

\* cited by examiner

*Primary Examiner* — Jue Louie
(74) *Attorney, Agent, or Firm* — Invoke

(57) ABSTRACT

Techniques for flow-based scoping are disclosed. A first code segment in a sequence of same-level code segments encapsulates a first lower-level lexical scope. The first lower-level scope is inclusive of scoping provided for the sequence of same-level code segments. The first code segment comprises a condition and an uninitialized variable. If executed, the first code segment causes the condition to be evaluated. If the condition is satisfied, the uninitialized variable is initialized and made available only within the first lower-level lexical scope. If a second code segment (a) references the uninitialized variable and (b) is in the sequence of same-level code segments or in a second lower-level lexical scope outside of the first lower-level lexical scope, an error message is presented indicating that the uninitialized variable is out of scope for the second code segment.

20 Claims, 9 Drawing Sheets

FIG. 7A

| Expression Form | True Set | False Set | Scoping |
|---|---|---|---|
| x matches P | bindings(P) | | |
| x && y | union(x.T, y.T) | intersect(x.F, y.F) | x.T in y |
| x \|\| y | intersect (x.T, y.T) | union(x.F, y.F) | x.F in y |
| x ? y : z | union(intersect(y.T, z.T), intersect(x.T, z.T), intersect(x.F, y.T)) | union(intersect(y.F, z.F), intersect(x.T, z.F), intersect(x.F, y.F)) | x.T in y<br>x.F in z |
| (x) | x.T | x.F | |
| !x | x.F | x.T | |

FIG. 7B

| Statement Form | Scoping |
|---|---|
| if (x) y else z; s | x.T in y<br>x.F in z<br>A(y) && !A(z) ? x.F in s<br>A(z) && !A(y) ? x.T in s |
| while (x) y; s | x.T in y<br>N(y) ? x.F in s |
| do { x } while (y); s | N(x) ? y.F in s |
| for (a; b; c) d; s | b.T in c<br>b.T in d<br>N(d) ? b.F in s |
| switch (e) {<br>   case P: a;<br>   case Q: b;<br>} | P.T in a<br>Q.T in b<br>N(a) ? intersection(bindings(P),<br>bindings(Q)) in b<br>   : bindings(Q) in b; |

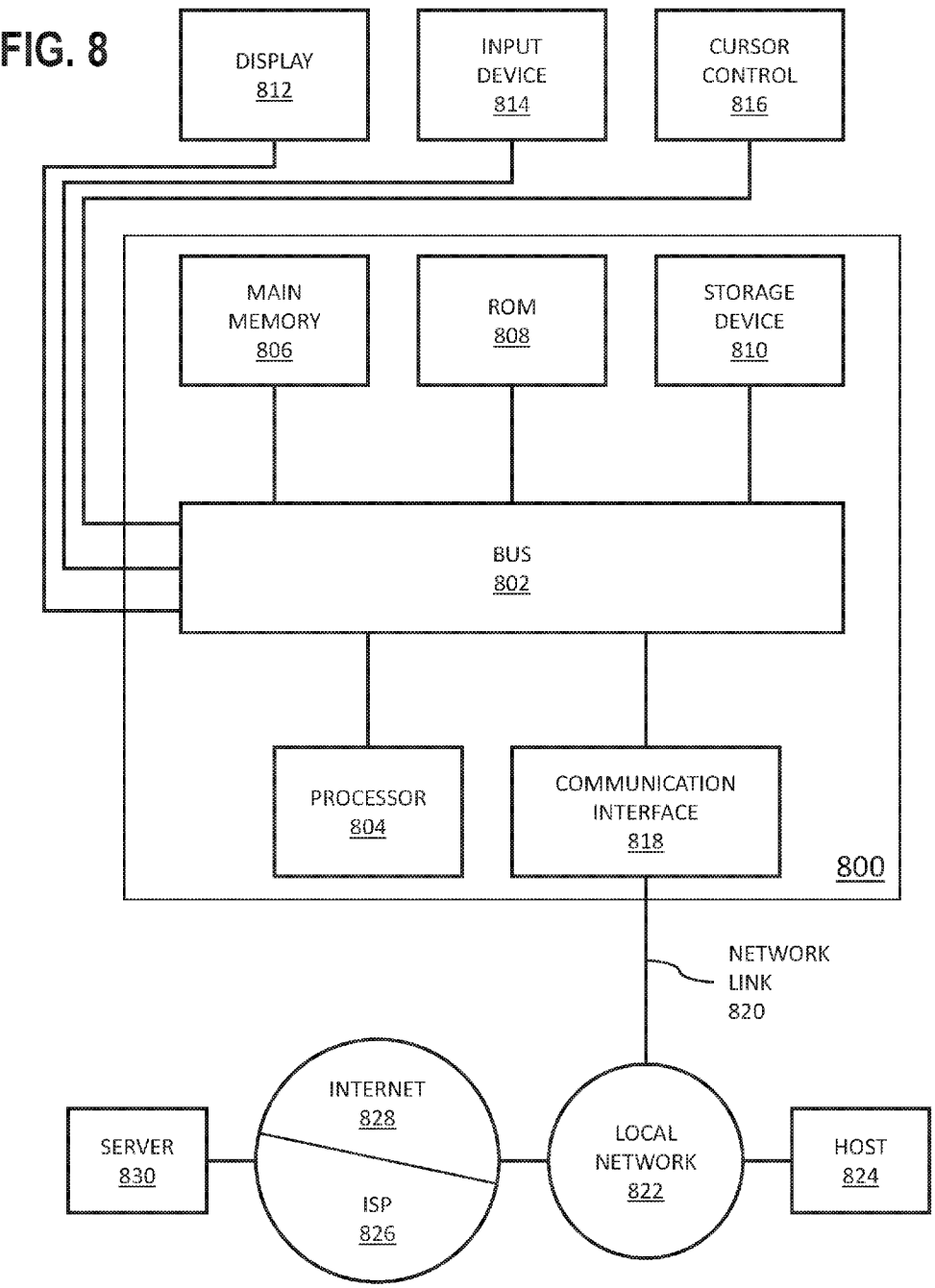

FLOW-BASED SCOPING

BENEFIT CLAIM; INCORPORATION BY REFERENCE

This application claims the benefit of U.S. Provisional Patent Application 62/483,342, filed Apr. 8, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to scoping variables. In particular, the present disclosure relates to flow-based scoping.

BACKGROUND

In computer programming, the scope of a variable is the code region in which the variable is available to use. For example, a particular variable may be in scope for a particular code segment or code region. As used herein, a "code segment" is a statement, expression, or any other type of code segment (or a portion thereof) to which scoping rules apply. A "code region" is a block, method, function, class, package, module, application, or any other type of code region that encloses one or more code segments. Scoping is a process of determining the scope(s) in which one or more variables are available to use. Specifically, in an embodiment, scoping determines the scope(s) of variable(s) in code where one sequence of code segments encapsulates one or more other sequences of code segments. Different programming languages have different rules for scoping variables. In general, there are two types of scoping: dynamic scoping and lexical scoping, as described in further detail below.

Typically, in dynamic scoping, a variable is in scope until the function in which the variable was declared returns. For example, suppose a function $f()$ declares a local variable x in one code segment and then calls another function $g()$ in a subsequent code segment. At runtime, x is in scope for all code segments in $f()$ following the code segment that declares x, both before and after calling $g()$. However, when $g()$ is called from within $f()$, x also is in scope for all code segments in $g()$, because $f()$ has not yet returned at the time $g()$ is called. In other words, when $g()$ is called from within $f()$, the scope of $g()$ is inclusive of the scope of $f()$. In a typical dynamically scoped programming language, if $g()$ declares another local variable also called x, then the $g()$'s variable x overrides $f()$'s variable x until $g()$ returns.

Typically, in lexical scoping, also referred to as static scoping, a variable's scope depends on the lexical environment in which the variable is declared, subject to the particular programming language's scoping rules. In a typical lexically scoped programming language, variables declared in methods are considered local variables. For example, suppose a method $f()$ declares a variable x in one code segment and then calls another method $g()$ in a subsequent code segment. Because x is local to $f()$, it is not necessary to compile or execute the application to know that x is not in scope for any code segments in $g()$. In other words, the scope of $g()$ is not inclusive of the scope of $f()$. Similarly, when a code segment in a method is used to instantiate an object, the scope of code segments within the newly instantiated object is not inclusive of the scope of the method in which the object was instantiated. However, the scope of a block in a method typically is inclusive of the scope of preceding top-level code segments in that method.

Typically, the scope of a variable depends on the code region where the variable is declared. A variable declared in a method may be in scope for subsequent code segments within the method, but not for code segments located outside of the method, such as in different methods in the same class or in another class. A variable declared within a block may be in scope for subsequent code segments located within the block, but not for code segments located outside of the block. In some object-oriented programming languages, when a variable is declared in a class but outside of a method, keywords may be used as access modifiers, to make the variable accessible at the class, subclass, package, or application level(s). For example, versions of the Java programming language include the access modifiers public, protected, and private. The absence of an access modifier may imply a default access level. For example, a variable declared in a class but outside of a method, without an explicit access modifier, may be accessible by the class and its containing package only.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7A-7B illustrate rules for performing control flow analysis in accordance with one or more embodiments; and FIG. 8 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
2.4 MODULE AND NON-MODULE ENVIRONMENTS
2.5 DEVELOPMENT ENVIRONMENT EXAMPLE
2.6 GENERATING AN AUTOMATIC MODULE
3. CODE WITH LEXICAL SCOPING
4. FLOW-BASED SCOPING
5. MISCELLANEOUS; EXTENSIONS
6. HARDWARE OVERVIEW
7. COMPUTER NETWORKS AND CLOUD NETWORKS
8. MICROSERVICE APPLICATIONS
9. HARDWARE OVERVIEW

1. General Overview

One or more embodiments provide techniques for flow-based scoping. A code segment in a sequence of same-level code segments encapsulates a lower-level lexical scope. The lower-level scope is inclusive of scoping provided for the sequence of same-level code segments. The code segment includes a condition and one or more uninitialized variables. If executed, the code segment causes the condition to be evaluated. If the condition is satisfied, the one or more uninitialized variables is/are initialized and made available only within the lower-level lexical scope. If another code segment (a) references the one or more uninitialized variables and (b) is in the sequence of same-level code segments or in a different lower-level lexical scope, an error message is presented indicating that the one or more uninitialized variables is/are out of scope for the other code segment.

One or more embodiments described in this Specification and/or recited in the claims may not be included in this General Overview section.

2. Architectural Overview

Figure 1:
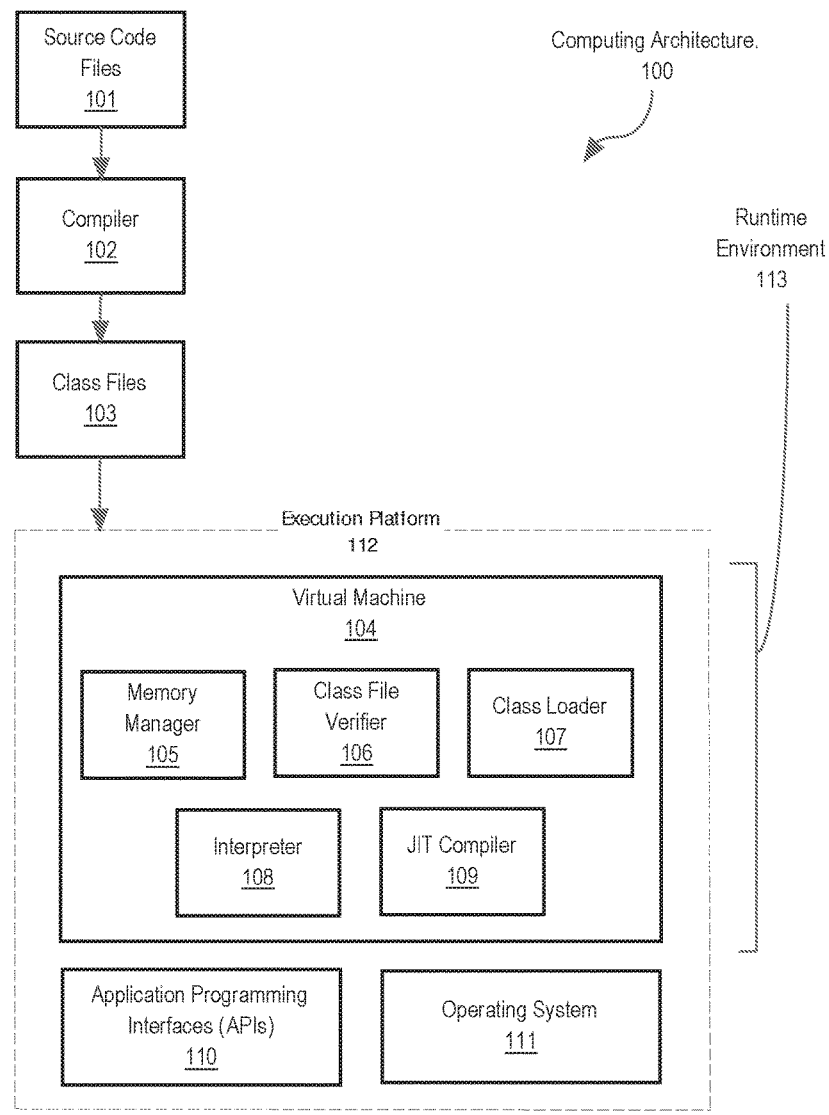
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
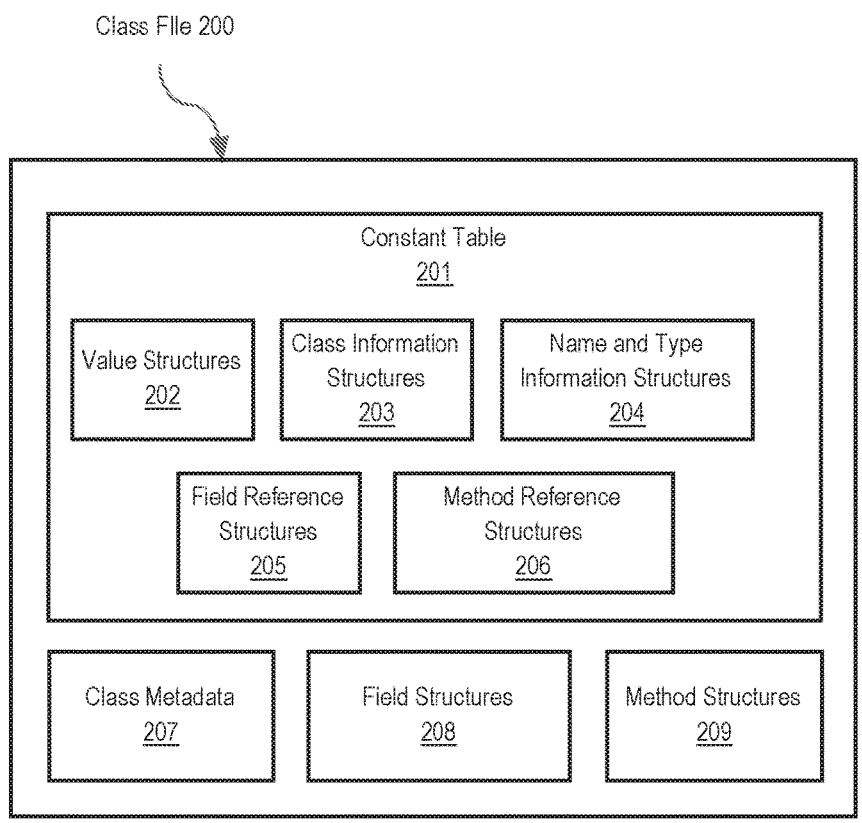
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
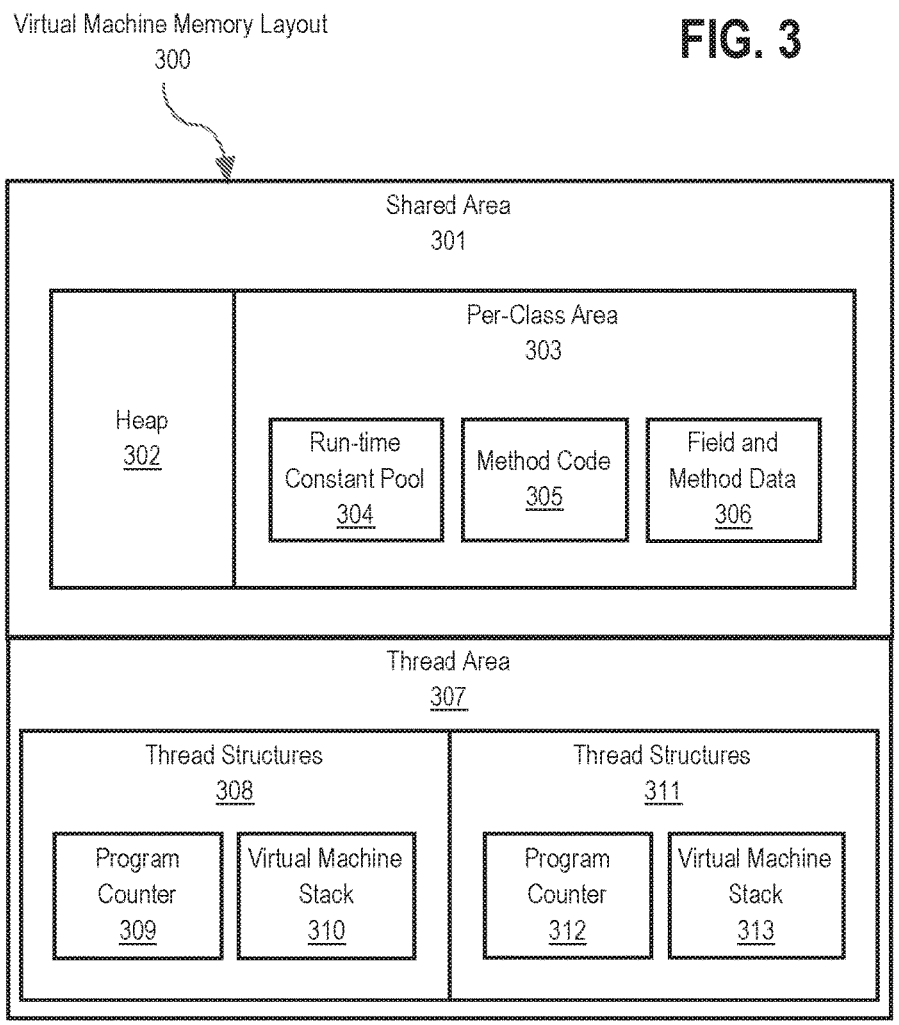
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
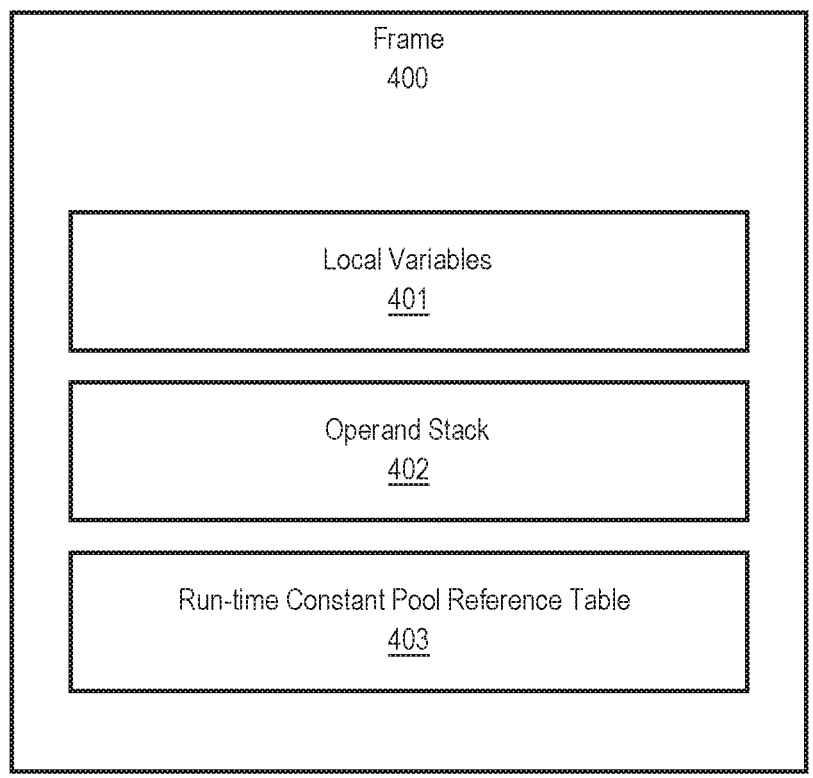
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Code with Lexical Scoping

In an embodiment, control flow analysis involves flow-based scoping, as described herein. Control flow analysis is a process for determining the order in which code segments are executed or evaluated. In an embodiment, as described herein, control flow analysis may also be used for scoping. Control flow analysis is a static process, meaning that it is performed without actually executing the code. For example, control flow analysis may be performed during software development (e.g., by an integrated development environment (IDE)) or at compile-time (e.g., by a compiler or associated tool). Control flow analysis may be performed on the source code segments themselves or on compiled code (e.g., Java bytecode).

Figure 5:
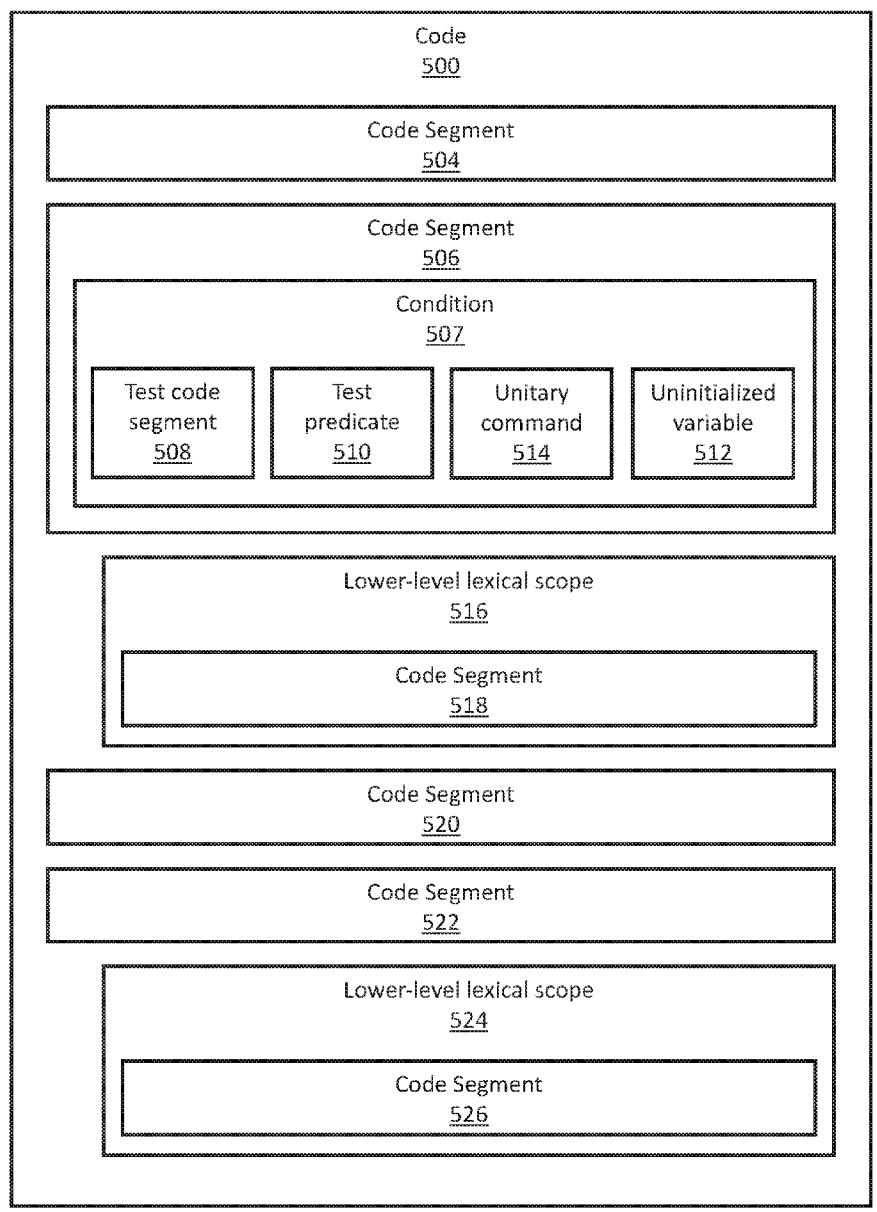
FIG. 5 is a block diagram illustrating code in accordance with one or more embodiments.

FIG. 5 is a block diagram illustrating code 500 in accordance with one or more embodiments. In one or more embodiments, the code 500 may include more or fewer components than the components illustrated in FIG. 5. The code 500 may be written in any programming language capable of implementing one or more operations described herein, or may be written in a combination of programming languages providing that capability.

In an embodiment, the code 500 includes a sequence of same-level code segments: code segment 504; code segment 506; code segment 520; and code segment 522. A sequence of same-level code segments may include more or fewer code segments than those illustrated in FIG. 5. A sequence of same-level code segments may be defined as code segments that follow each other in code, excluding the contents of blocks or of other code structures providing lower-level lexical scopes. For purposes of this discussion, a code segment is said to "encapsulate" code when the code segment provides an entry point to the encapsulated code, for example using brackets, parentheses, or some other lexical construct used to encapsulate code. For example, top-level code segments in a method may be considered a sequence of same-level code segments. However, the contents of a block encapsulated by a top-level code segment are not part of the sequence of same-level code segments. In the following code example, lines are numbered for ease of reference:

```
1    int x;
2    x = getValue( );
3    if (x == 3) {
4        // not in the sequence of same-level code segments
5    }
```

In the example above, lines 1, 2, 3 up to the opening bracket, and 5 from the closing bracket are a sequence of same-level instructions. In an embodiment, code segments within a block are considered part of their own sequence of same-level instructions, having a lower-level lexical scope than the top-level code segments. Code may include multiple levels of same-level code segments, with corresponding levels of lexical scopes. For example, consider a method that includes an if-then statement. Within the brackets of the if-then statement, there is another if-then statement. In this example, there are at least three levels of lexical scope: (1)

the top level of the method; (2) within the first if-then statement; and (3) within the second if-then statement. Sequences of same-level code segments may be used in many different contexts and are not limited to code segments contained in methods and/or blocks.

In an embodiment, a sequence of same-level code segments does not allow any variable that is in scope for one subset of the same-level code segments to be locally "scoped out" (i.e., not in the scope) of another subset of the same-level code segments. If code segment 504 declares a variable that is in scope for code segment 506, that variable may also be required to be in scope for code segment 520 and code segment 522. This requirement would not apply to a variable that is initialized in a code segment and made available only in a lower-level lexical scope, as discussed below.

In an embodiment, a code segment 506, which is a code segment in the same-level sequence of code segments, encapsulates a lower-level lexical scope 516. Code segment 518 is a code segment included in the lower-level lexical scope 516 and is not part of the same-level sequence of code segments that includes code segment 506. For example, the lower-level lexical scope 516 may be designated by opening and closing brackets, as in the example above, and code segment 518 may be a code segment contained within the brackets.

In an embodiment, code segment 506 includes a condition 507 and an uninitialized variable 512. The uninitialized variable 512 may be initialized and made available (a) only in the lower-level lexical scope 516 and (b) only when the condition 507 is satisfied. The condition 507 may take many different forms. For example, the condition 507 may be a method call that conditionally returns a value. In an embodiment, the condition 507 includes one or more test code segments 508, a test predicate 510, and a unitary command 514. The unitary command 514 is executable to check the test code segment 508 against the test predicate 510, as described in further detail below. For example, the unitary command 514 may be a keyword designated for matching operations, such as the word "matches." In an embodiment, the unitary command 514 is native to a programming language, i.e., built into a programming language specification supported by the compiler. The test predicate 510 and uninitialized variable 512 may be combined in a manner that is recognizable by the programming language syntax, which may be referred to as a "pattern." Scoping based on a condition, as described herein, may be referred to as flow-based scoping, because control flow analysis may be used to determine whether a variable is in scope for a particular code segment. Flow-based scoping is discussed in further detail below.

In an embodiment, the test code segment 508 is a variable. The variable may be initialized and made available in the scope of the sequence of same-level instructions before encountering code segment 506. For example, the variable may be initialized in code segment 504. Alternatively, the variable may be initialized in code segment 506 itself. In the latter case, using the example illustrated in FIG. 5, the variable may be available for use by code segment 520 and code segment 522, but not by code segment 504. Alternatively, the test code segment 508 may be a method call, a function call, or any other type of code segment configured to return a value that can be checked against the test predicate 510.

In an embodiment, code segment 522, which is a code segment in the same sequence of same-level code segments as code segment 506, encapsulates another lower-level lexical scope 524. Code segment 522 may include a condition and uninitialized variable, similar to code segment 506, or may be another type of code structure configured to encapsulate a lower-level lexical scope 524. If code segment 522 includes a condition, the condition may be based on one or more of the same test code segment(s) 508 on which code segment 506's condition 507 is based. Alternatively or in addition, the condition may be based on one or more other test code segments.

In an embodiment, code segment 526 is a code segment included in the other lower-level lexical scope 524 and is not part of the same-level sequence of code segments that includes code segment 506 and code segment 522. Further, lower-level lexical scope 524 is not the same lexical scope as lower-level lexical scope 516. A variable initialized and made available only in lower-level lexical scope 516 is not available in lower-level lexical scope 524, and vice versa.

In an embodiment, the uninitialized variable 512 is not in scope for code segment 504, code segment 520, code segment 524, or code segment 526, because none of those code segments are within the lower-level lexical scope 516 encapsulated by code segment 506. In general, the uninitialized variable 512 may be available for use only after it has been initialized in code segment 506, within the lower-level lexical scope 516. The uninitialized variable 512 may not even have been declared before reaching code segment 506.

4. Flow-Based Scoping

Figure 6:
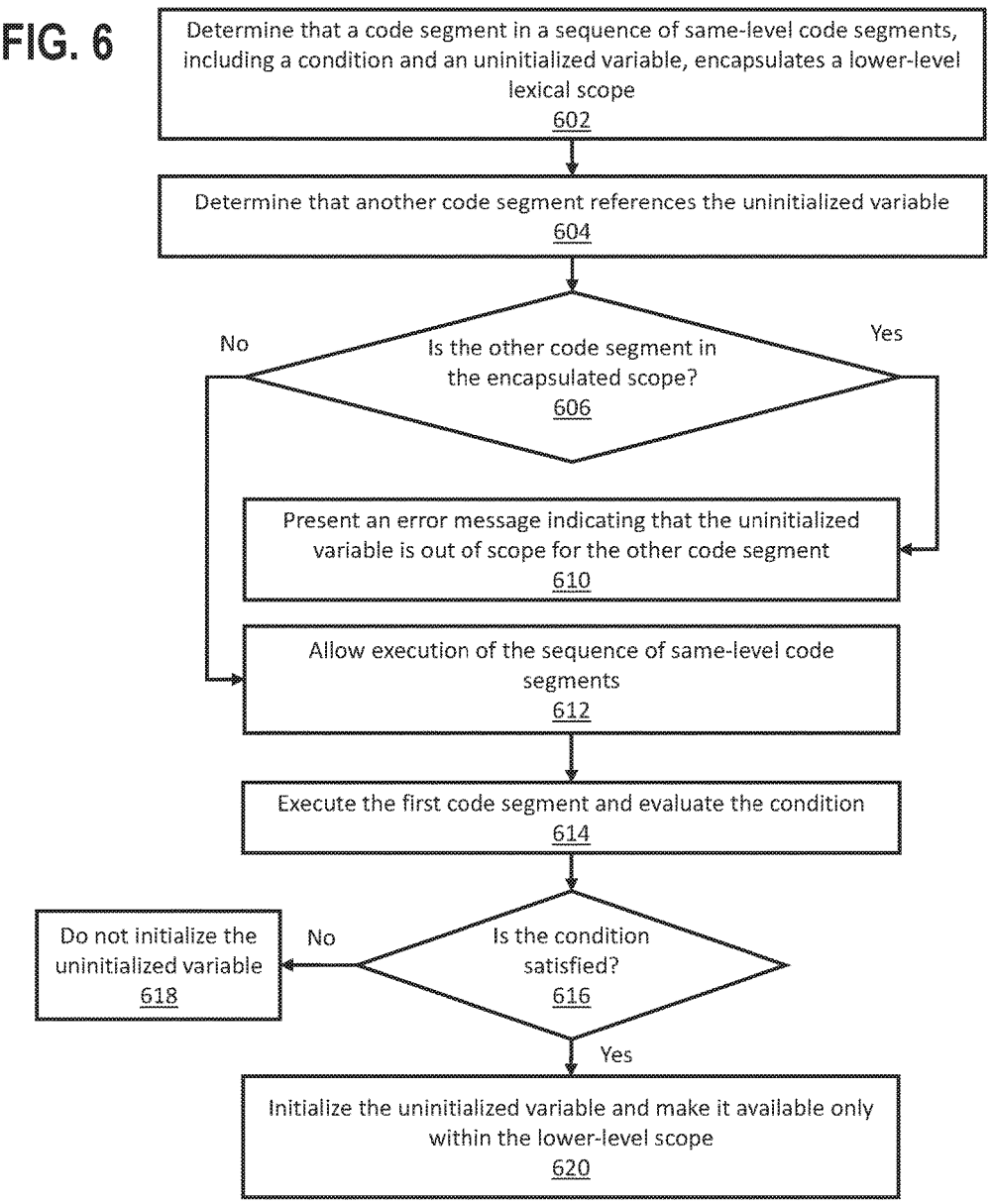
FIG. 6 illustrates a set of operations for flow-based scoping in accordance with one or more embodiments.

FIG. 6 illustrates a set of operations for flow-based scoping in accordance with one or more embodiments. One or more operations illustrated in FIG. 6 may be modified, rearranged, or omitted all together. Accordingly, the particular sequence of operations illustrated in FIG. 2 should not be construed as limiting the scope of one or more embodiments.

In one or more embodiments, a process determines, based on control flow analysis, that a code segment in a sequence of same-level code segments encapsulates a lower-level lexical scope (Operation 602). For ease of discussion, this code segment is referred to as the "encapsulating code segment," because it encapsulates the lower-level lexical scope (the "encapsulated scope"). The encapsulating code segment includes a condition and an uninitialized variable. As described below, if the encapsulating code segment is executed and the condition is satisfied, then the encapsulating code segment causes the uninitialized variable to be initialized and made available only in the encapsulated scope. The process performing this step may be part of an integrated development environment (IDE), a compiler, and/or any other process configured to use control flow analysis to evaluate scoping. In an embodiment, a condition is satisfied when the condition evaluates as true. However, different types of conditions may be used, including conditions that are satisfied when they evaluate as false.

In one or more embodiments, the process determines that another code segment references the uninitialized variable (Operation 604). For ease of discussion, this code segment is referred to simply as the "other" code segment, although it may encapsulate another lower-level lexical scope. Based on control flow analysis, the process determines whether the other code segment is in the encapsulated scope (Operation 606). If the encapsulating code segment were executed and the condition were satisfied, the uninitialized variable would be initialized and made available only within the encapsulated scope. If the other code segment were outside the encapsulated scope, the uninitialized variable would not be available to the other code segment. Attempting to execute the other code segment would cause a runtime error, because the reference to the uninitialized variable could not be resolved. The uninitialized variable would be out of scope for the other code segment. In general, the other code segment may be considered to be outside the encapsulated scope if (a) the other code segment is in the sequence of same-level code segments, or (b) the other code segment is in a different lower-level lexical scope not encapsulated by the encapsulating code segment.

In one or more embodiments, if the other code segment is not in the encapsulated scope, an error message is presented (Operation 610). The error message indicates that the uninitialized variable is out of scope for the other code segment. In addition, the error message may signify that compiling and/or execution of the sequence of same-level instructions will not be permitted. Alternatively or in addition, the error message may provide a suggestion for changing the code so that the uninitialized variable will be in scope for the other code segment.

In one or more embodiments, if the other code segment is in the encapsulated scope, then execution of the sequence of same-level code segments is allowed (Operation 612). At runtime, the encapsulating code segment may be executed so that the condition is evaluated (Operation 614). If the condition is satisfied (Operation 616) then the encapsulating code segment causes the uninitialized variable to be initialized and made available only within the lower-level scope encapsulated by the first code segment (Operation 620). In one or more embodiments, if the condition is not satisfied, then the uninitialized variable is not initialized (Operation 618).

In an embodiment, the specifics of initializing the uninitialized variable (Operation 620) depend on the format of the encapsulating code segment and the condition itself. As illustrated in FIG. 5, the condition may include one or more test code segments, a test predicate, and a unitary command executable to check the one or more test code segments against the test predicate. The test predicate may include an object type, and initializing the uninitialized variable may involve casting the initialized variable as that object type.

In the following code example, lines are numbered for ease of reference:

```
// Example One
1    x = getValue( );
2    if (x matches String s) {
3        System.out.println(s);
4    } else if (x matches Integer i) {
5        // s is not in scope here
6    }
// Example Two
7    x = getValue( );
8    if (!(x matches String s)) {
9        // s is not in scope here
10   } else {
11       // s is in scope here
12   }
```

In Example One above, the code segment on line 2, "if (x matches String s)," includes a condition "x matches String" and an uninitialized variable "s." In this example, it is assumed that s has not been declared before reaching this code segment. The keyword matches is a unitary command to check a test code segment, in this case the initialized variable x, against a test predicate. In this example, the test predicate is the object type String. Thus, this code segment's condition is satisfied when the initialized variable x has an object type that matches String. The combination of the test predicate and the uninitialized variable forms a pattern, "String s." An exact object match may not be necessary; it may be sufficient that the object type of x can be cast as a String. For example, many programming languages allow a date to be cast as a string. Here, if the condition is satisfied, then the uninitialized variable s is initialized as x cast as a String. Further, in Example One, control flow analysis dictates that when s is initialized by the code segment on line 2, it is available in the encapsulated scope, i.e., the lower-level lexical scope between the brackets following the "if" code segment (i.e., line 3). The code segment "else if (x matches Integer i)" (line 4) is in the same sequence of same-level code segments as the first "if" code segment (line 2) and encapsulates a different lower-level lexical scope. If the uninitialized variable s had been referenced in a code segment within the else if block (e.g., on line 5), an error message would have been presented (Operation 610) indicating that s is out of scope for the code segment attempting to reference it.

In Example Two above, the code segment on line 8, "if (!(x matches String s))," includes a different condition "!(x matches String s)." This code segment's condition is satisfied when the initialized variable x does not have an object type that matches String. Further, in Example Two, because of the negation in the condition, control flow analysis dictates that s is available in the lower-level scope between the brackets following the "else" code segment (i.e., line 10). Code within the else block can be executed only if the match with object type String succeeds, in which case s is initialized. If s had been referenced in a code segment on line 9, an error message would have been presented (Operation 610) indicating that s is out of scope for the code segment attempting to reference it.

In one or more embodiments, matching code segments may be combined to form compound Boolean code segments. For example:

```
// Example Three
if ((x matches String y) || (x matches Integer y)) {
    // y is in scope here; its runtime type depends on the
    // outcome of evaluating the test predicates
}
// Example Four
if ((x matches String s) && !s.isEmpty( )) {
    // s is in scope here, and also for the second part
    // of the compound code segment
}
```

In an embodiment, as shown in Example Three above, the same uninitialized variable name may be used in different, non-conflicting test predicates associated with the same lower-level lexical scope. Further, as in Example Four above, a uninitialized variable may be initialized and made available in multiple scopes. These multiple scopes may be viewed (and may be handled internally by a compiler, IDE, etc.) as a single, non-continuous scope. Making a variable available in a scope may also be referred to as "injecting" the variable into the scope. In Example 4, the variable s is injected into both the second part of the compound Boolean code segment and the block surrounded by the brackets. Many different types of compound Boolean code segments may be used.

In an embodiment, test predicates may be combined as different cases in a switch statement. A switch statement may be thought of as an n-way jump; it is a statement presenting several conditions, or cases, for short-circuiting sequential evaluation. In this context, "short-circuiting" means that when a condition is satisfied, subsequent conditions are not evaluated. Each switch case may encapsulate a different lower-level lexical scope. In the following example, a case with the form "case object-type letter" is functionally equivalent to "if x matches object-type letter" as discussed above. In this example, ellipses are used to denote one or more code segments (not shown) executed if the corresponding case evaluates as true.

```
switch (x) {
    case Integer i: ...;
    case Byte b: ...;
    case Long l: ...;
    case Double d: ...;
    default: ...;
}
```

In the example above, an uninitialized variable (i, b, l, or d) is initialized and made available (a) only when the corresponding case label matches the target x and (b) only in the lower-level scope represented by the ellipses following that particular case. The variable (i, b, l, or d), once initialized, is not in scope for the other cases or outside of the switch code segment.

In an embodiment, a code segment may be used to initialize more than one uninitialized variable. For example:

```
switch (x) {
    case Circle(Point center, int radius): ...;
    // If x is a Circle, center and radius are in the
    // lower-level lexical scope represented by the
    // ellipses.
}
```

In an embodiment, if a condition in a code segment can never be satisfied, then the lower-level lexical scope encapsulated by that code segment may never be reachable. Control flow analysis may be configured to identify situations where a lower-level lexical scope is unreachable. For example, in the code example above, if x had been initialized as a Square and there were no possibility that it had become a Circle, an error message might be presented indicating that "case Circle" can never be satisfied.

In an embodiment, control flow analysis leverages a programming language's existing flow rules and introduces new rules to determine the scopes of variables, including uninitialized variables that are introduced conditionally as described herein. Specifically, control flow analysis may determine scoping based on the true and/or false sets of one or more expressions in a code segment. FIGS. 7A-7B illustrate rules for performing control flow analysis in accordance with one or more embodiments. The rules illustrated in FIGS. 7A-7B are provided for illustrative purposes only and should not be construed as limiting one or more embodiments.

As shown in FIG. 7A, an expression may take many different forms. The true and/or false sets for each expression depend on the form of the expression. Scoping is based on the true and/or false sets. For a hypothetical expression abbreviated as "e," the true set indicates which variable(s), if any, are introduced (i.e., initialized and made available) when e evaluates as true. The false set indicates which variable(s), if any, are introduced when e evaluates as false. For example, as shown in FIG. 7A, for an expression of the form "x matches P" (where P includes an uninitialized variable), the true set includes the variable bindings in P. The false set is empty. As another example, for an expression of the form "x && y," the true set is the logical union of the true sets of x (i.e., x.T) and y (i.e., y.T). The false set is the logical intersection of the logical intersection of the false sets of x (i.e., x.F) and y (i.e., y.F). In this example, x.T is in scope in y, such that any variable introduced when x evaluates as true will be available while evaluating y. FIG. 7A includes examples of such rules applied to different forms of expressions. In an embodiment, two or more different forms of expressions may be combined into a composite expression, with the scoping logic applied at different levels of nested expressions accordingly. For example, a composite expression of the form "!(x && y)" would have true and false sets that are reversed from those of "x && y," as indicated by the true and false sets for "!x."

FIG. 7B illustrates rules for performing control flow analysis for certain forms of statements, in accordance with one or more embodiments. The statement forms shown in FIG. 7B may be read as pseudocode. For example, a statement of the form "if (x) y else z; s" may alternatively be represented as follows:

```
if (x) {
    y;      // Execute the code represented by "y"
} else {
    z;      // Execute the code represented by "z"
}
s;          // Execute the code represented by "s" (outside the "if"
            statement)
```

In the example above, x.T is in scope for y and x.F is in scope for z. The following is an example of this form of statement, using the "matches" keyword:

```
if (e matches T v) {    // T is a type and v is an uninitialized variable.
    y;                  // v is in scope
} else {
    z;                  // v is not in scope
}
s;                      // v is not in scope
```

In an embodiment, a programming language specification includes rules that define situations where a control construct (e.g., an expression, statement, block, or branch of code) completes abruptly. In general, a control construct is considered to complete abruptly when, for some reason, the control construct is prevented from completing normally. For example, according to the Java™ Language Specification ("JLS") for Java™ Standard Edition 8 ("SE8"), a "break" statement with no label always completes abruptly (JLS SE8 14.15). An "if" statement completes abruptly when a sub-statement (the "then" branch or the "else" branch) of the "if" statement completes abruptly, such as due to a "break" statement with no label (JLS SE8 14.9). However, a "while" statement still completes normally when a sub-statement completes abruptly due to a "break" statement with no label (JLS SE8 14.12.1). These rules from JLS SE8 are provided for exemplary purposes only. Many different kinds of control constructs may complete abruptly for many different reasons, depending on the particular programming language specification. The Java™ programming language specification includes control constructs that may complete abruptly, for example, due to a "break" statement, a "continue" statement, a "return" statement, or a "throw" statement.

In an embodiment, control flow analysis includes scoping rules for situations where a control construct always completes abruptly, as defined by the corresponding programming language specification. A control construct always completes abruptly when it includes code that (a) is always encountered within that control construct and (b) causes the control construct to complete abruptly. For example:

```
if (!(e matches T x)) {
    return;
}
s;
```

In the example above, when e matches type T (i.e., the negated "matches" expression evaluates as true), x would normally be made available in an "else" block. However, in this example, the "else" block is missing. In addition, the "then" branch always completes abruptly, due to the "return" statement. In this situation, the system may introduce x into the scope of s, where it would normally not be in scope. In FIG. 7B, conditions where a control construct always completes abruptly are represented as A(y), A(z), etc. Specifically, A(y) may be read as "when flow leads to the control construct represented by y, that control construct always completes abruptly."

In an embodiment, control flow analysis includes scoping rules for situations where a control construct never completes abruptly, as defined by the corresponding programming language specification. A control construct never completes abruptly when it does not include any code statement that might explicitly cause the control construct to complete abruptly. The control construct may nonetheless complete, but does not do so abruptly. For example:

```
while (!(e matches T x)) {
    ...
    break;
    ...
}
s;
```

In this example, if the "while" statement completes normally because e matches type T, then the system may introduce x into the scope of s, where it would not normally be in scope. Under the rules of JLS SE8 that determine whether a control construct completes abruptly or completes normally, the "while" statement also completes normally if the "break" statement in its body is executed. (Note that in JLS SE8, all "break" statements complete abruptly.) In this example, the system should not introduce x into the scope of s, because it is not necessarily the case that e matches type T. In FIG. 7B, condition N(x) evaluates whether execution of x always completes either (a) normally or (b) with an abrupt action other than a "break" with no label. In an embodiment, N(x) is false only when x might possibly complete abruptly because of a "break" with no label. In an embodiment, scoping rules based on whether code always completes abruptly or never completes abruptly with a break with no label help ensure that the system does not attempt to make a variable available in a scope where the variable may not have been properly initialized.

In one or more embodiments, flow-based scoping, using uninitialized variables that are initialized based on a condition, allows for greater ease and flexibility of programming. For example, a particular variable name may be bound to different types of objects in a particular lower-level lexical scope, depending on which of multiple conditions is satisfied. Further, this sort of flow-based scoping may permit a programmer to declare a variable for use only in a particular lower-level lexical scope, without worrying about whether or how the variables might be referenced outside of that particular lower-level lexical scope. Further, by determining whether a code segment references an uninitialized variable that is not in scope for that code segment, runtime errors may be avoided. In general, one or more embodiments allow for flow-based scoping while preventing that sort of malformed code segment from being compiled into a running program.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   determining, by an integrated development environment (IDE) or a compiler evaluating lexical scoping of a set of code, that a first code segment in a sequence of same-level code segments encapsulates a first lower-level lexical scope,
      wherein lexical scoping comprises determining at least one lexical scope in which one or more variables are available to use based on at least one lexical construct that encapsulates one or more code segments in which the one or more variables are declared,
      wherein the first lower-level scope is inclusive of scoping provided for the sequence of same-level code segments,
      wherein the first code segment comprises a condition and one or more uninitialized variables,
      wherein execution of the first code segment, if performed, causes the condition to be evaluated and, if the condition is satisfied, causes the one or more uninitialized variables to be initialized and made available only within the first lower-level lexical scope;
   determining, by the IDE or the compiler, that a second code segment (a) references the one or more uninitialized variables and (b) is in the sequence of same-level code segments or in a second lower-level lexical scope outside of the first lower-level lexical scope; and
   presenting, by the IDE or the compiler, an error message indicating that the one or more uninitialized variables is out of scope for the second code segment.

2. The one or more media of claim 1,
   wherein the condition of the first code segment comprises at least one initialized variable, a test predicate, and a unitary executable command,
   wherein the unitary executable command is to perform a check of the at least one initialized variable against the test predicate.

3. The one or more media of claim 2, wherein the unitary executable command is native to a programming language.

4. The one or more media of claim 2, wherein the condition is satisfied when the check of the at least one initialized variable against the test predicate returns true.

5. The one or more media of claim 2, wherein the test predicate comprises an object type, and wherein the one or more uninitialized variables is initialized as the at least one initialized variable cast as the object type.

6. The one or more media of claim 2, wherein the at least one initialized variable is in scope before the first code segment in the sequence of same-level code segments.

7. The one or more media of claim 1, wherein the second lower-level lexical scope is encapsulated by a third code segment comprising a second one or more uninitialized variables, wherein execution of the third code segment, if performed, causes the second one or more uninitialized variables to be initialized and made available only within the second lower-level lexical scope.

8. The one or more media of claim 7, wherein the third code segment causes the second one or more uninitialized variables to be initialized and made available when an other condition is satisfied.

9. The one or more media of claim 8, wherein both the condition and the other condition are based, in part, on a same initialized variable.

10. The one or more media of claim 1, wherein the sequence of same-level code segments does not allow any variable in one subset of the same-level code segments to be locally scoped out of another subset of the same-level code segments.

11. The one or more media of claim 1, wherein presenting the error message is performed via a graphical user interface (GUI) of an integrated development environment (IDE).

12. The one or more media of claim 1, wherein presenting the error message is performed at compile-time.

13. The one or more media of claim 1, wherein the first code segment is associated with a case in a switch statement.

14. The one or more media of claim 13, wherein the second code segment is associated with another case in the switch statement.

15. The one or more media of claim 1, wherein the second code segment is located in an else block associated with the first code segment.

16. The one or more media of claim 1, wherein the error message comprises a suggestion for changing code so that the one or more uninitialized variables is in scope for the second code segment.

17. The one or more media of claim 1, wherein the first code segment and the second code segment are different parts of a compound Boolean code segment.

18. The one or more media of claim 17, further storing instructions which, when executed by the one or more processors, cause:
   determining whether the one or more uninitialized variables is in scope for a third code segment encapsulated by the compound Boolean code segment.

19. A system comprising:
   at least one device including a hardware processor;
   the system being configured to perform operations comprising:
      determining, by an integrated development environment (IDE) or a compiler evaluating lexical scoping of a set of code, that a first code segment in a sequence of same-level code segments encapsulates a first lower-level lexical scope,
         wherein lexical scoping comprises determining at least one lexical scope in which one or more variables are available to use based on at least one lexical construct that encapsulates one or more code segments in which the one or more variables are declared, wherein the first lower-level scope is inclusive of scoping provided for the sequence of same-level code segments, wherein the first code segment comprises a condition and one or more uninitialized variables, wherein execution of the first code segment, if performed, causes the condition to be evaluated and, if the condition is satisfied, causes the one or more uninitialized variables to be initialized and made available only within the first lower-level lexical scope;

determining, by the IDE or the compiler, that a second code segment (a) references the one or more uninitialized variables and (b) is in the sequence of same-level code segments or in a second lower-level lexical scope outside of the first lower-level lexical scope; and presenting, by the IDE or the compiler, an error message indicating that the one or more uninitialized variables is out of scope for the second code segment.

20. A method comprising:

determining, by an integrated development environment (IDE) or a compiler evaluating lexical scoping of a set of code, that a first code segment in a sequence of same-level code segments encapsulates a first lower-level lexical scope, wherein lexical scoping comprises determining at least one lexical scope in which one or more variables are available to use based on at least one lexical construct that encapsulates one or more code segments in which the one or more variables are declared, wherein the first lower-level scope is inclusive of scoping provided for the sequence of same-level code segments, wherein the first code segment comprises a condition and one or more uninitialized variables, wherein execution of the first code segment, if performed, causes the condition to be evaluated and, if the condition is satisfied, causes the one or more uninitialized variables to be initialized and made available only within the first lower-level lexical scope;

determining, by the IDE or the compiler, that a second code segment (a) references the one or more uninitialized variables and (b) is in the sequence of same-level code segments or in a second lower-level lexical scope outside of the first lower-level lexical scope; and presenting, by the IDE or the compiler, an error message indicating that the one or more uninitialized variables is out of scope for the second code segment, wherein the method is performed by at least one device comprising a hardware processor.

* * * * *

UNITED STATES PATENT AND TRADEMARK OFFICE
CERTIFICATE OF CORRECTION

PATENT NO. : 10,310,827 B2
APPLICATION NO. : 15/947432
DATED : June 4, 2019
INVENTOR(S) : Bierman et al.

Page 1 of 1

It is certified that error appears in the above-identified patent and that said Letters Patent is hereby corrected as shown below:

In the Specification

In Column 2, Line 52, delete "FIG." and insert -- FIGS. --, therefor.

Signed and Sealed this
Twenty-first Day of July, 2020

Andrei Iancu
*Director of the United States Patent and Trademark Office*